United States Patent
Lazzarin et al.

(10) Patent No.: US 8,834,068 B2
(45) Date of Patent: Sep. 16, 2014

(54) GROUP AND METHOD FOR LAYING AND BURYING PIPELINES AT THE SEAFLOOR

(75) Inventors: Diego Lazzarin, Treviso (IT); Massimiliano Formenti, Mira (IT)

(73) Assignee: SAIPEM S.p.A., San Donato Milanese (IT)

( * ) Notice: Subject to any disclaimer, the term of this patent is extended or adjusted under 35 U.S.C. 154(b) by 9 days.

(21) Appl. No.: 13/265,403

(22) PCT Filed: Apr. 20, 2010

(86) PCT No.: PCT/IB2010/000871
§ 371 (c)(1),
(2), (4) Date: Dec. 8, 2011

(87) PCT Pub. No.: WO2010/122395
PCT Pub. Date: Oct. 28, 2010

(65) Prior Publication Data
US 2012/0114420 A1 May 10, 2012

(30) Foreign Application Priority Data
Apr. 23, 2009 (IT) .............................. MI2009A0689

(51) Int. Cl.
*F16L 1/12* (2006.01)
*E02F 5/00* (2006.01)
*E02F 5/10* (2006.01)
*F16L 1/16* (2006.01)

(52) U.S. Cl.
CPC ................. *E02F 5/104* (2013.01); *E02F 5/006* (2013.01); *E02F 5/105* (2013.01); *F16L 1/163* (2013.01)
USPC ............ 405/171; 405/158; 405/159; 405/162

(58) Field of Classification Search
USPC .................. 405/158, 159, 161, 162, 171, 184
See application file for complete search history.

(56) References Cited

U.S. PATENT DOCUMENTS 2,731,800 A 1/1956 Collins
3,670,514 A * 6/1972 Breston et al. ................ 405/160
(Continued)

FOREIGN PATENT DOCUMENTS

| DE | 30 45 901 | 7/1982 |
| EP | 1 985 766 | 10/2008 |
| JP | 2003 336765 | 11/2003 |

OTHER PUBLICATIONS

International Search Report Issued Jul. 14, 2010 in PCT/IB10/000871 Filed Apr. 20, 2010.

*Primary Examiner* — Benjamin Fiorello
(74) *Attorney, Agent, or Firm* — Oblon, Spivak, McClelland, Maier & Neustadt, L.L.P.

(57) ABSTRACT

A device includes a digging device to cut the seafloor and with a device for hooking onto a pipeline and for sliding over the same. The device includes at least one float device constrainable to the pipeline for supporting it in span, connected to the back of said digging device with respect to the direction of the movement. The method includes excavating the seafloor by a digging device, collecting a float device from a storage base and transporting it to said pipeline, constraining the first float device to the pipeline behind the digging device and connecting the first float device to the digging device, when at least one portion of pipeline is in a suspended configuration, and when the portion of suspended pipeline increases, collecting a subsequent float device and constraining it to the pipeline and connecting the same to the float device previously constrained.

10 Claims, 6 Drawing Sheets

(56) References Cited

U.S. PATENT DOCUMENTS

| | | | |
|---|---|---|---|
| 3,732,701 A * | 5/1973 | Lynch | 405/162 |
| 4,087,981 A * | 5/1978 | Norman | 405/161 |
| 4,127,006 A * | 11/1978 | Oosterkamp | 405/171 |
| 4,149,326 A | 4/1979 | Rosa et al. | |
| 4,280,289 A * | 7/1981 | Bassompierre-Sewrin | 37/309 |
| 4,304,505 A * | 12/1981 | Silvestri et al. | 405/170 |
| 4,314,414 A * | 2/1982 | Reynolds et al. | 37/313 |
| 4,395,158 A * | 7/1983 | Brooks | 405/161 |
| 4,436,450 A * | 3/1984 | Reed | 405/171 |
| 4,516,880 A | 5/1985 | Martin | |
| 4,586,850 A * | 5/1986 | Norman et al. | 405/163 |
| 6,196,766 B1 | 3/2001 | Graham | |
| 2004/0031174 A1 | 2/2004 | Ballard | |

* cited by examiner

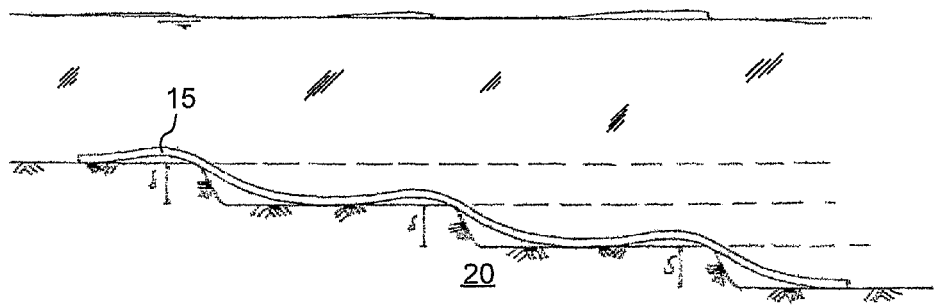
Fig. 1
PRIOR ART
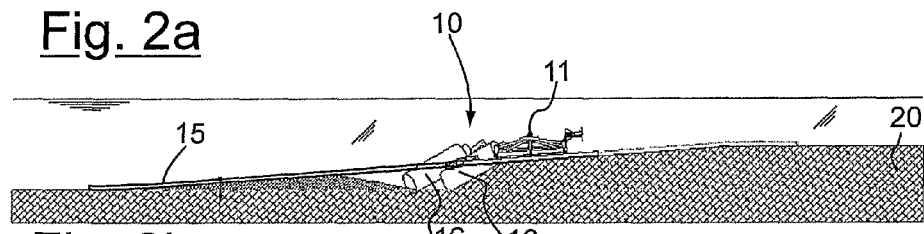
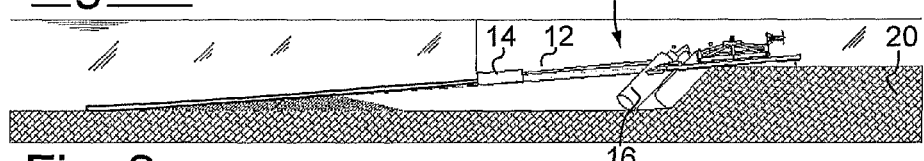
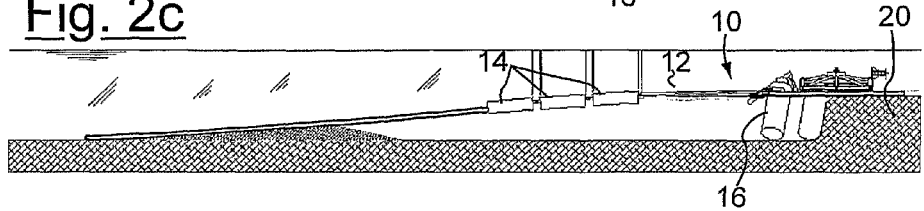

Fig. 6
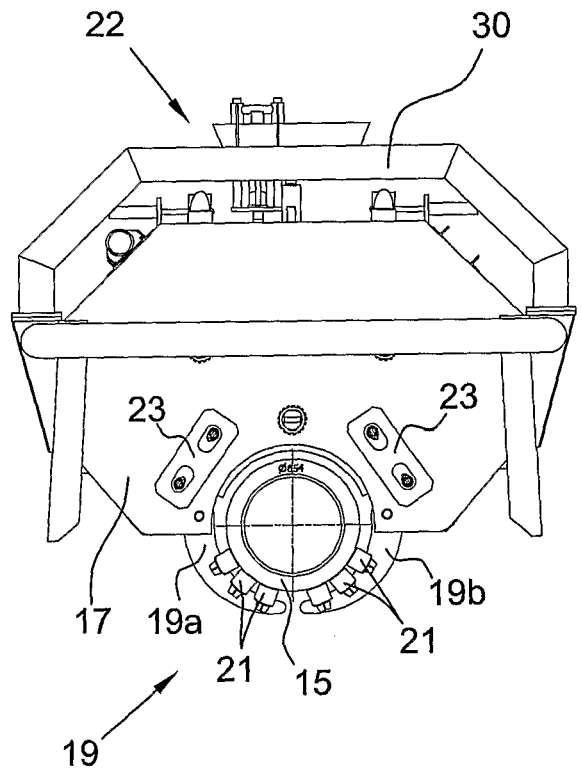
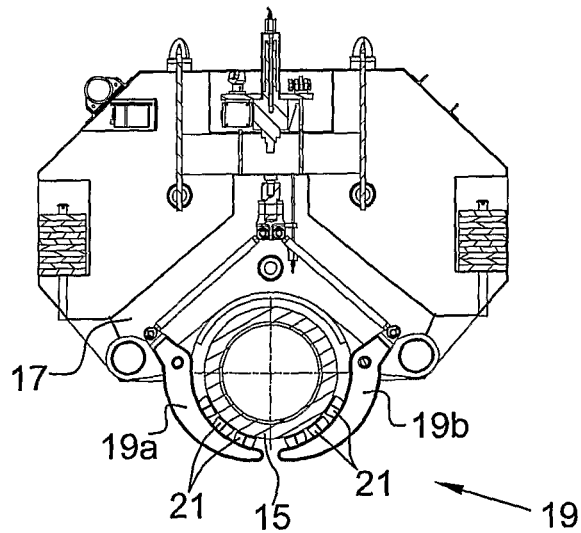
Fig. 7

GROUP AND METHOD FOR LAYING AND BURYING PIPELINES AT THE SEAFLOOR

BACKGROUND

The present invention relates to a group and method for laying and burying pipelines at the seafloor.

In laying pipelines at the seafloor it is also desirable to bury them in order to protect them from specific local factors such as fishing, navigation, streams, wave-motion, natural events and so forth.

On the basis of these factors and depending on the morphology and bathymetry of the seafloor, in addition to deciding upon the necessity of burying a partial tract or the whole length of a pipeline, the characteristics of the cavity, i.e. the digging depth, the entity and gradation of the covering, are also established.

In recent years, compatibly with the economical aspect implied in the burying operations of pipelines at the seafloor, this operation has become standard in sub-coastline tracts, also due to the imposition of regulations.

There are, in particular, three methods for laying and burying pipelines in the seafloor:
  pre-trenching, i.e. the preliminary digging and treatment of the trench destined for receiving the pipeline, before the laying operation of the same;
  co-trenching during the launching and laying of the pipeline; and
  post-trenching after the laying of the pipeline, i.e. burying the pipeline by removing the underlying material, after being launched, hauled or placed in the desired position.

The pre-trenching methods are preferably applied in the case of compact seafloors, consisting of cemented sediments or lithifications or rocks. The co-trenching and post-trenching methods, on the contrary, are particularly suitable for seafloors covered by a mantle of sediments having a thickness greater than the depth required for the excavation, or consisting of non-lithified or non-cemented materials or easily breakable materials.

The pre-trenching methods require a much larger excavation than the pipeline dimension, as the latter is laid subsequently, or a particularly precise laying technique, called guided laying.

The co-trenching methods require the concurrence of two types of equipment, launching and digging equipment, and the synchronism of the two operations making the procedure difficult to effect.

The post-trenching methods can be effected after laying the pipeline, as they do not require the contemporaneous presence of two different naval means.

The co-trenching and post-trenching methods have the disadvantage of a possible deformation or damage to the pipes during the digging phase, as shown in FIG. 1.

During the digging, in fact, the pipelines are in a so-called "span" configuration, i.e. suspended between the area of the seafloor already excavated and the portion of seafloor not yet emptied, in particular in correspondence with the immediate position of the trenching machine.

In this configuration, if the difference in level between the unexcavated and excavated portion is considerable, the pipelines are subjected to stress which could cause the deformation or even collapse of the same.

Consequently, the post-trenching, and co-trenching excavations are currently effected with successive small-depth passages in order to reduce the span which is created between the digging machine and the seafloor already excavated, to the minimum.

The necessity of various digging passages in any case causes a lengthening of the overall operating period necessary in the co-trenching and post-trenching methods.

BRIEF SUMMARY OF THE INVENTION

An objective of the present invention is to overcome the drawbacks mentioned above and in particular to identify a group and method for the laying and burying of pipelines on seafloors which allows the positioning of pipes in situ in short times, at the same time maintaining the stress suffered by said pipelines within tolerance limits.

Another objective of the present invention is to provide a group and method for the laying and burying of pipelines on seafloors, which is capable of effecting the excavation of the seafloor during or after the laying of the pipes, reducing the risks of deformation or collapse of the same.

A further objective of the present invention is to provide a group and method for the laying and burying of pipelines on seafloors, which is capable of effecting deep excavations of the seafloor in a reduced number of passages, without damaging the pipes to be laid and buried.

These and other objects according to the present invention are achieved by providing a group and method for the laying and burying of pipelines on seafloors as specified in the independent claims.

Further characteristics of the group and method for the laying and burying of pipelines on seafloors are subject of the dependent claims.

BRIEF DESCRIPTION OF DRAWINGS

The characteristics and advantages of a group and method for the laying and burying of pipelines on seafloors according to the present invention, will appear more evident from the following illustrative and non-limiting description, referring to the enclosed schematic drawings in which:

FIG. 1 is a schematic configuration of the possible effects caused by the laying and burying of pipelines according to the methods currently used;

FIGS. 2a-2c show the sequence of operating phases implemented by the method for the laying and burying of pipelines on the seafloor, according to the present invention;

FIG. 6 is a raised front view of a floating element used in the laying and burying group of pipelines on the seafloor, according to the present invention;

FIG. 7 is a sectional view along the line A-A of FIG. 5;

DETAILED DESCRIPTION

Figure 3:
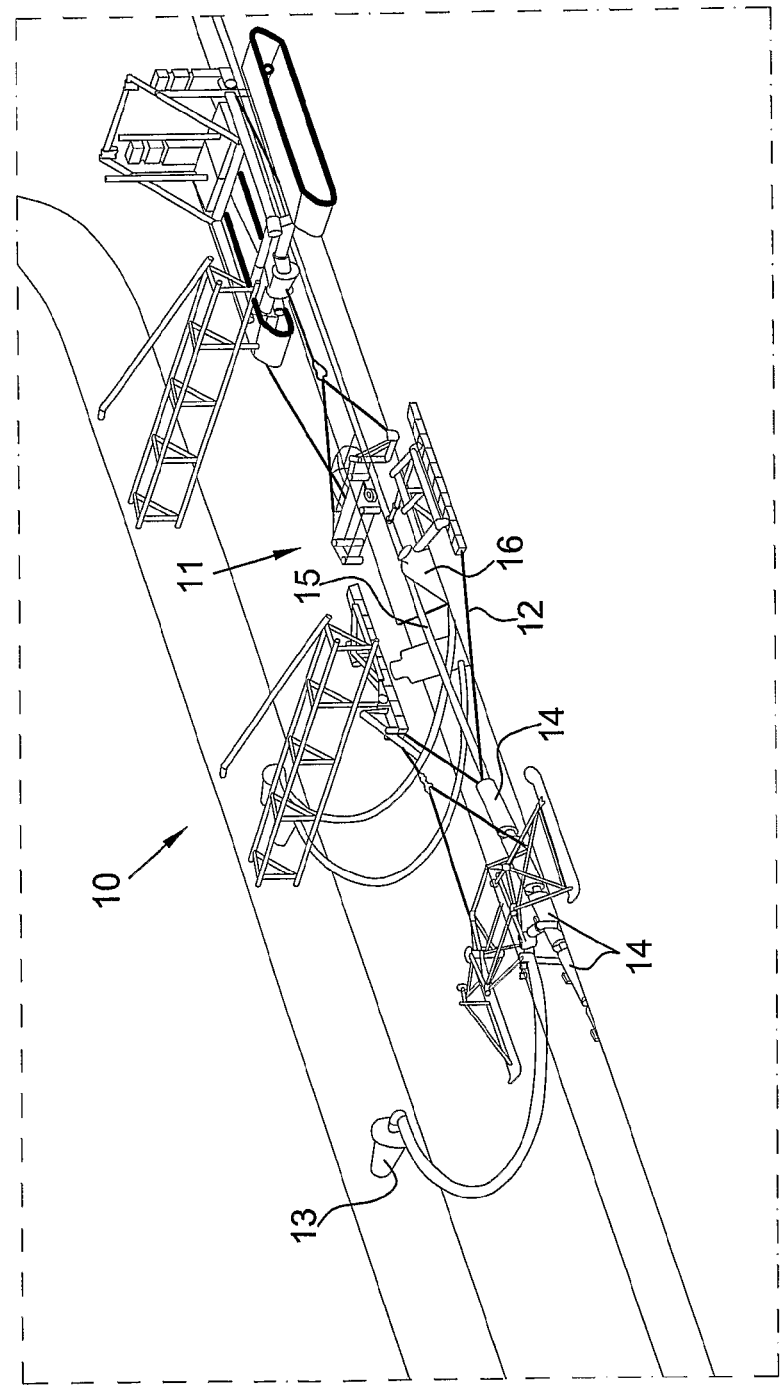
FIG. 3 is a partial perspective view of the laying and burying group of pipelines on the seafloor according to the present invention.
Figure 4:
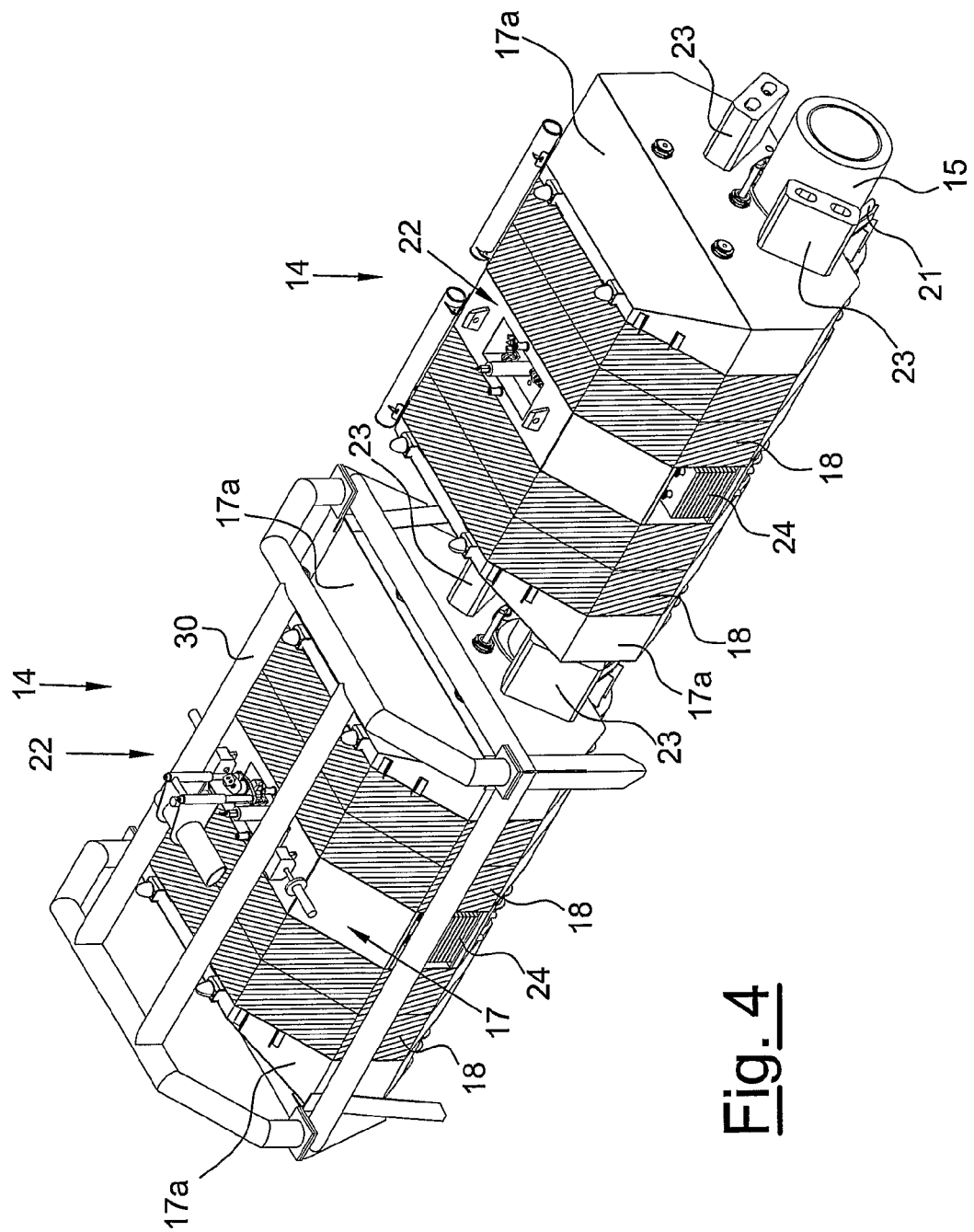
FIG. 4 is a perspective view of two floating elements used in the laying and burying group of pipelines on the seafloor, according to the present invention.
Figure 5:
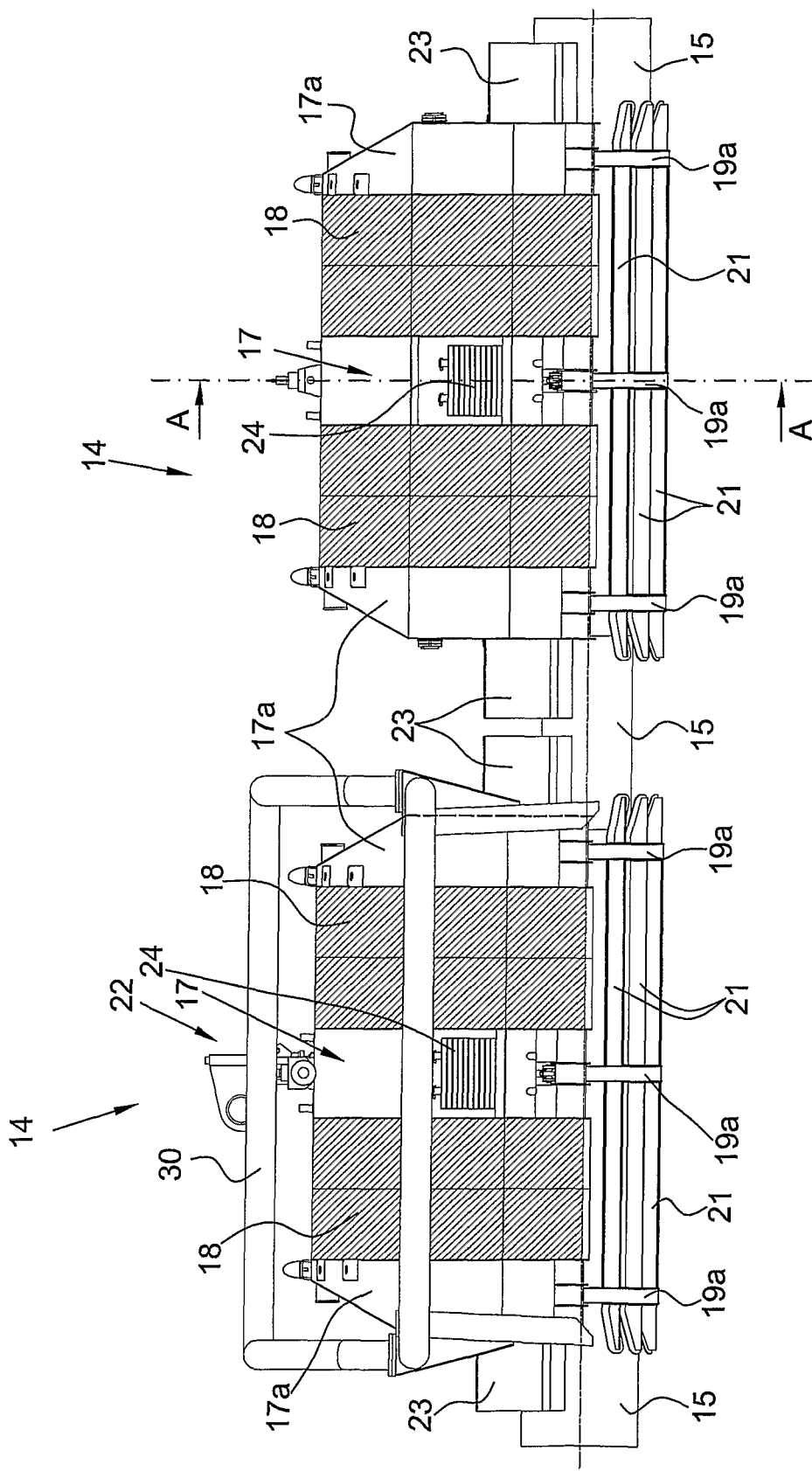
FIG. 5 is a raised side view of the two floating elements of FIG. 4.
Figure 8:
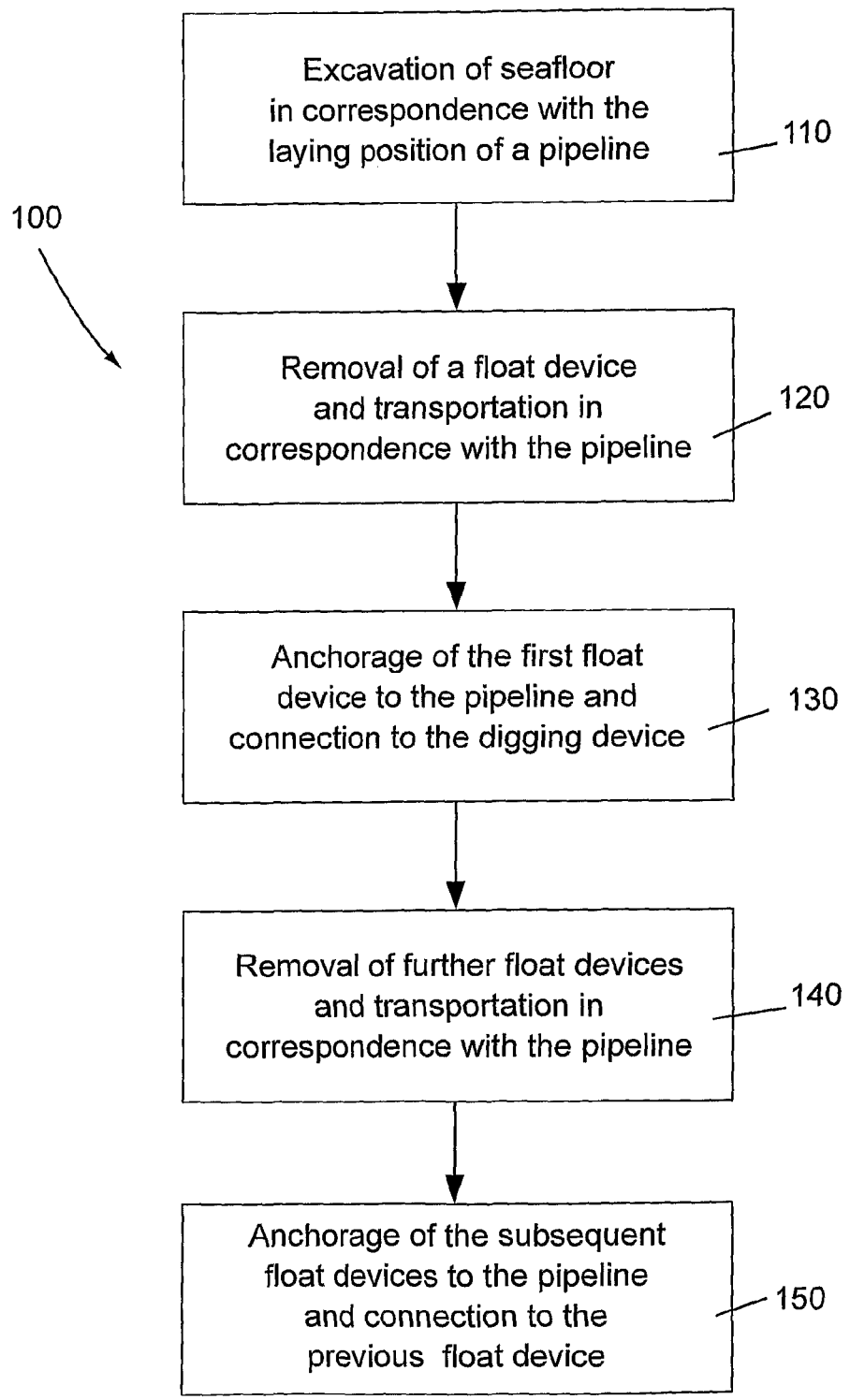
FIG. 8 is a block scheme of the method for the laying and burying of pipelines on the seafloor, according to the present invention.

With reference to the figures, these illustrate a laying and burying group of pipelines on the seafloor, indicated as a whole with 10.

The group for the laying and burying of pipelines 10 comprises a digging device 11, such as a trenching machine, for example, equipped with cutting means 16 of the seafloor 20, such as milling cutters, toothed wheels and/or diamond-disks, and sediment suction and removal means 13, such as draining pumps and/or suction pumps which suck the debris of the excavation and discharge it at the side of the same, forming rims and spurs on the edges of the trench produced by the digging device 11.

In order to effect the excavation of the seafloor 20, during or after the laying of the pipelines 15, the digging device 11 is equipped with hooking means to a pipeline 15 and means for sliding on the same, such as, for example, gripping and hauling clamps and/or rubberized rollers.

In this way, it is possible to both maintain the relative position between the pipeline 15 and the digging device 11 to prevent the movement of the milling cutters and mechanical cutting organs 16 from accidentally damaging the coating, generally of cementitious material, which covers it externally, and also to slide along the pipeline 15 in the advancing phase.

The functioning of the excavation device 11 during the progression and excavation is normally operated by remote control and controlled by an umbilical cable (not shown) consisting of a bundle of connections which supply on the one hand the hydraulic and electric feeding, and on the other the driving commands of the various functions and sensors installed on the digging device 11 itself.

According to the present invention, the laying and burying group of pipelines 10 comprises a plurality of float devices 14 connected to the digging device 11 and constrainable to the pipeline 15.

In particular, a first float device 14 is connected by specific first connection means 12, such as cables for example, behind the digging device 11 with respect to the advance direction of the same, and in particular behind the sediment suction and removal means 13.

The subsequent float devices 14 are suitably connected to the immediately previous floating device, with respect to the advance direction of the digging device 11. In this way, a so-called series or train of float devices 14 is formed, which, during the digging phase, becomes gradually constrained to the pipeline 15 in order to support is when it is in the span configuration between the excavation front and front of the trench.

The number of float devices 14 used in subsequent phases in the group for the laying and burying of pipelines 10 according to the present invention, for supporting the pipeline, varies according to the depth and development of the trench effected by means of the relative device 11, in addition to the characteristics of the pipeline 15.

The overall number of float devices 14 used during the whole laying and burying procedure is determined in relation to the physical characteristics of the pipeline 15 and burying depth.

The physical characteristics of the pipeline 15 which effect the determination of the overall number of float devices 14 necessary are:
the weight, linked to the thickness of the tubular body of the pipe 15, generally made of steel, and its outer coating of cementitious material; and
the rigidity—also linked to the thickness of the steel body— which causes the lay back of the pipe and, together with the type of material used, its free span resistance limit.

The float devices 14 used in the group 10 for laying and burying pipelines according to the present invention preferably comprise a rigid structure 17, made of steel for example, having an elongated conformation with a longitudinal development, to which at least one floating element 18 preferably made of a material having a lower density with respect to the density of the water, such as polyethylene shells for example, is integrally constrained.

In the preferred conformation illustrated, the rigid structure 17 and the at least one floating element 18 form a sandwich structure in which the rigid structure 17 comprises two end walls 17a with respect to its longitudinal development, between which the at least one floating element 18 is interposed.

Hooking means 19 to a pipeline 15 are envisaged in a peripheral position of the float device 14, which form a tubular seat which extends for the whole longitudinal development of the float device 14.

Said hooking means 19 are preferably composed of a plurality of pairs of sickle-shaped arms 19a, 19b hinged to the rigid structure 17 and distributed along the whole longitudinal extension of the same 17, so as to form a tubular jaw structure.

The opening and closing of the jaw structure 19a, 19b is piloted by means of hydraulic actuators or oil-dynamic pistons, such as for example hydraulic jacks, driven by the umbilical cable.

In the interior of the tubular structure, the pairs of arms 19a, 19b preferably support a plurality of sliding blocks 21 having an elongated conformation and arranged parallel to each other, along the longitudinal extension of the rigid structure 17.

Once the float device 14 has been hooked to the pipeline 15, it rests on the parallel sliding blocks 21 which allow it to slide with respect to the float device 14.

The sliding surface of the sliding blocks 21 which is in contact with the pipeline 15 is preferably made of a low-friction material such as polytetrafluoroethylene (PTFE) or a wear-resistant steel. The float devices 14 also preferably comprise hooking means 22 to a caged transport structure 30 used for the positioning of each float device 14 hooked to the pipeline 15.

The float devices 14 are removed, by means of the transport structure 30, from a storage base, for example situated on a supporting vessel (not illustrated), transported in correspondence with the pipeline 15 in the implementation phase and guided during the hooking phase to the pipeline 15 and to the float device 14 previously installed. In order to maintain a minimum reciprocal distance between two successive float devices 14, said float devices 14 comprise at least one rigid spacing means 23 protruding from the end walls 17a of the rigid structure 17.

Furthermore, in order to control the position of the train of float devices 14 with respect to the digging device 11, at least the first float device 14 is equipped with braking means, consisting for example of a sliding block pressed onto the pipeline 15 overcoming the resistance of a spring. The activation of said braking means can be hydraulic.

The activation of the braking means has the purpose for example of preventing the train of float devices 14 from coming too close to the cutting means 16 of the digging device 11.

In order to establish the pipe supporting action from case to case, the float devices 14 are optionally equipped with ballasts 24 having a weight adequate for calibrating the force exerted by the float devices 14 on the pipeline 15.

The functioning 100 of the group for laying and burying pipelines 10 is the following.

Through the digging device 11 begins to create a trench at the sea bottom 20 in correspondence with the laying position of the pipeline 15 (phase 110).

The first digging phase proceeds without any further interventions until the pipeline 15 is close to a "critical span" configuration, i.e. when the distance between the two rest points of the pipeline 15 is such as to create stress on the same 15 which could cause its collapse or deformation.

Close to this critical span configuration, a first float device 14 is taken from a storage base and transported in correspondence with the pipeline 15 (phase 120).

The first float device 14 is then constrained to the pipeline 15 in a rear position with respect to the digging device 11 and is connected to the same 11 (phase 130).

As the portion of pipeline, which is in a suspended configuration, increases as the digging proceeds, further float devices 14 are taken in succession from the storage base and transported in correspondence with the pipeline 15 (phase 140).

The successive float devices 14 are constrained to the pipeline and connected to the float device 14 previously installed (phase 150).

A train of float devices 14 connected to the digging device 11 and constrained to the pipeline 15 is therefore gradually created in order to sustain it in its span configuration during the digging procedure on the part of the digging device 11. As the digging device 11 advances, the train of float devices 14 slides along the pipeline 15 in order to keep constant the reciprocal positioning between the digging device and the first float device 14 situated in direct connection with the same 11.

The group and method for the laying and burying of pipelines at the sea bottom according to the present invention therefore allow pipelines to be positioned in situ, with the subsequent and contemporaneous excavation of the sea bottom in order to bury them without them being subjected to stress due to the in span layout which is created as a result of the difference in level between the rest points of the pipeline created by the excavations.

It is therefore possible to effect the excavations in a single passage or in a reduced number of passages at a great depth, thus reducing the overall implementation and burying times of the pipelines at the sea bottom.

Finally, the group for the laying and burying of pipelines thus conceived can obviously undergo numerous modifications and variants, all included in the invention; furthermore, all the details can be substituted by technically equivalent elements. In practice, the materials used, as also the dimensions, can vary according to the technical demands.

The invention claimed is:

1. A device for laying and burying pipelines at the seafloor, comprising:
   a digging device provided at least with means for cutting into the seafloor and with means for hooking onto a pipeline and for sliding over the pipeline;
   a plurality of float devices configured to be fixed to said pipeline to support it the pipeline in span, connected to the back of said digging device with respect to the direction of movement thereof,
   wherein a first float device of the plurality of float devices is directly connected to said digging device through first connection means, and
   wherein subsequent float devices after the first float device, are connected to the immediately previous float device with respect to the direction of movement of said digging device so as to form a train of float devices.

2. The device for laying and burying pipelines at the seafloor according to claim 1,
   wherein said plurality of float devices include:
   a rigid structure configured with longitudinal extension to which at least one floating element is fixedly connected, and means for hooking to said pipeline provided at a peripheral portion of said rigid structure.

3. The device for laying and burying pipelines at the seafloor according to claim 2,
   wherein said rigid structure and said at least one floating element form a sandwich structure, said rigid structure comprising two end walls with respect to its longitudinal extension between which said at least one floating element is arranged.

4. The device for laying and burying pipelines at the seafloor according to claim 2,
   wherein said hooking means comprise a plurality of pairs of sickle-shaped arms hinged to said rigid structure and distributed along the longitudinal extension thereof so as to form a tubular jaw structure.

5. The device for laying and burying pipelines at the seafloor according to claim 4,
   wherein said tubular jaw structure is made to open and close through a plurality of hydraulic actuators.

6. The device for laying and burying pipelines at the seafloor according to claim 4,
   wherein said pair of arms supports a plurality of sliding blocks, having elongated configuration and arranged parallel to each other and parallel to the longitudinal extension of said rigid structure, inside said tubular structure.

7. The device for laying and burying pipelines at the seafloor according to claim 6,
   wherein said sliding blocks have a sliding surface made at least partially from polytetrafluoroethylene.

8. The device for laying and burying pipelines at the seafloor according to any one of claims 3 to 7,
   wherein said float device comprises at least one spacing means projecting from said end walls of said rigid structure.

9. The device for laying and burying pipelines at the seafloor according to any one of claims 2 to 7,
   wherein at least said first float device comprises brake means suitable for stopping said float device from sliding on said pipeline.

10. A method for laying and burying pipelines at the seafloor, comprising:
    making an excavation in the seafloor at a laying position of a pipeline through a digging device;
    close to a critical span configuration of said pipeline, picking up a first float device from a plurality of float devices, from a storage base and transporting it the first float device to said pipeline;
    attaching said first float device to said pipeline behind said digging device and connecting said first float device to said digging device, when at least one portion of pipeline is in suspended configuration;
    as said portion of pipeline that is in suspended configuration increases, repeatedly picking up a subsequent float device from the plurality of float devices; and
    attaching said subsequent float device to said pipeline and connecting it to said float device attached earlier.

* * * * *